United States Patent [19]

Thelen

[11] 3,769,607

[45] Oct. 30, 1973

[54] SWITCHED OSCILLATOR CLOCK PULSE GENERATOR

[75] Inventor: William Thelen, Glen Ellyn, Ill.

[73] Assignee: Bell Telephone Laboratories, Incorporated, Murray Hill, N.J.

[22] Filed: Mar. 8, 1972

[21] Appl. No.: 232,873

[52] U.S. Cl. .................... 331/2, 307/262, 307/269, 331/49, 331/55, 331/56

[51] Int. Cl. .................... H03b 3/04

[58] Field of Search .................... 331/47, 49, 55, 56, 331/2; 307/262, 269; 340/248

[56] References Cited

UNITED STATES PATENTS

| | | | |
|---|---|---|---|
| 3,518,567 | 6/1970 | Helgesson | 331/2 |
| 3,370,251 | 2/1968 | Overstreet, Jr. | 331/55 |
| 3,662,277 | 5/1972 | White | 331/2 |

*Primary Examiner*—Roy Lake
*Assistant Examiner*—Siegfried H. Grimm
*Attorney*—W. L. Keefauver

[57] ABSTRACT

A clock pulse generating system is disclosed which comprises four separate oscillator circuits. Any one of the four oscillator circuits may be selected as a master to which the other oscillator circuits are slaved. The master oscillator may be synchronized to an externally generated signal or may be free running. Selector circuits within the pulse generating system are responsive to level and phase errors to select a trouble-free oscillator to be the master, and in case of failure of any of the other oscillators, the signal from the master oscillator may be used directly to generate the desired output signal for the failed oscillator.

10 Claims, 7 Drawing Figures

OUTPUT SELECTOR CIRCUIT

SWITCHED OSCILLATOR CLOCK PULSE GENERATOR

BACKGROUND OF THE INVENTION

1. Field of the Invention

This invention relates to timing systems, and more particularly relates to a multiple oscillator timing system in which any of the oscillators may be chosen to be the master for the remaining oscillators.

2. Prior Art

The successful operation of a time division switching system is perhaps more dependent on the timing circuit which generates the system's basic clock pulse than any other single circuit. It is, therefore, highly desirable that this timing circuit be made most reliable. Increased reliability has been accomplished in the prior art by the simple duplication of timing circuits and switching from one timing circuit to the other in case a failure is detected in the timing circuit being used. Triplicated timing systems are also known in the prior art. One such system employs majority voting to derive a proper timing signal which in turn is used to synchronize the individual timing circuits. However, the known prior art systems are not sufficiently reliable for a number of applications. In particular, for time division switching systems, where the system must remain operative even in the presence of multiple failures, the duplicated and triplicated clock circuits with voting do not meet the need.

SUMMARY OF THE INVENTION

In accordance with this invention, a clock pulse generating system comprises a plurality of signal generators for generating a corresponding plurality of independent synchronized sequences of pulses, and a master selector. The master selector may select any of the generators of the system to be the master generator and the remaining generators are phase locked to the master. The master selector is responsive to signals from signal level error and signal phase error detection circuits in order to select a new master in case an error is detected in the generator which was previously selected to be the master. The signal generator chosen to be master may be synchronized to an externally generated reference signal or may be free running. The master selector is arranged to select a fault-free signal generator in accordance with an algorithm which is a function of the combinations of phase and level errors detected from all of the signal generators of the system. If a faulty signal generator is taken out of service, the selection algorithm may be altered by the setting of a flip-flop. Thus, the master selector uses one algorithm to make a selection when all of the signal generators are in operating condition and another algorithm under certain conditions when fewer than all of the signal generators are in operating condition.

Furthermore, an output selector is associated with each signal generator and is responsive to signals from the erorr detection circuits to substitute the signal generated by the master pulse generator for that of the faulty generator. Thus, a number of synchronized sequences of clock pulses are produced as long as the system has at least one error-free signal generator.

In one illustrative embodiment of this invention, a clock pulse generating system comprises four independent oscillator circuits, a master selector, and a number of output selectors. Each oscillator circuit has a local oscillator, a phase lock circuit to phase lock the local oscillator to a reference signal, phase error and level error detection circuits, an output selector, and a shaping circuit. The level error detection circuits compare the level of the local oscillator signal against a standard level, and the phase error detection circuits compare the phase of the local oscillator signal with the reference signal. The master selector selects one of the four oscillator circuits to be master on the basis of phase and level error signals from all four oscillator circuits, and applies the signal generated by the local oscillator of the master circuit to the remaining circuits as a reference signal to which the other oscillators are phase locked. In the absence of error indications from any of the four oscillator circuits, the master selector chooses a first one (oscillator circuit A) to be master. In the presence of error signals indicating that the oscillator circuit A is faulty, one of the other oscillator circuits (B, C, or D) will be chosen as master in accordance with a prescribed rule of action. If after diagnosis oscillator circuit A is found to be faulty, the rule of action for the selection of a master may be altered so as to give a different basis for the selection of a master from the three remaining oscillator circuits than that which is used when the system has four active oscillator circuits. The output selector of each of the oscillator circuits selects either the signal from the local oscillator or the reference signal, on the basis of phase and signal errors existing within the oscillator circuit, and applies the selected signal to the shaping circuit. The shaping circuit derives a clock pulse from the signal applied thereto and this clock pulse represents the output of the associated oscillator circuit. Thus, each timing circuit presents an output clock signal even when its local oscillator is not functioning properly.

In the illustrative system which consists of four independent oscillator circuits, four independent sequences of clock pulses are generated. In one particular application, two highly reliable independent synchronized sequences of clock pulses are required. To achieve this, the signals from two of the four oscillator circuits are employed to generate one such sequence and signals from the other two oscillator circuits are employed to generate the other sequence. Level error detection circuits are connected to the output terminals of each of the oscillator circuits and two independent selector circuits are employed to selectively apply the signals from the oscillator circuits to the conductor on which the sequences are to appear. Furthermore, in some applications it may be required to have one highly reliable sequence of clock pulses. In such case, the signals from all four oscillator circuits may be selectively applied to one output conductor on the basis of signals from level error detectors connected to the output terminals of the oscillator circuits.

DETAILED DESCRIPTION

Figure 1:
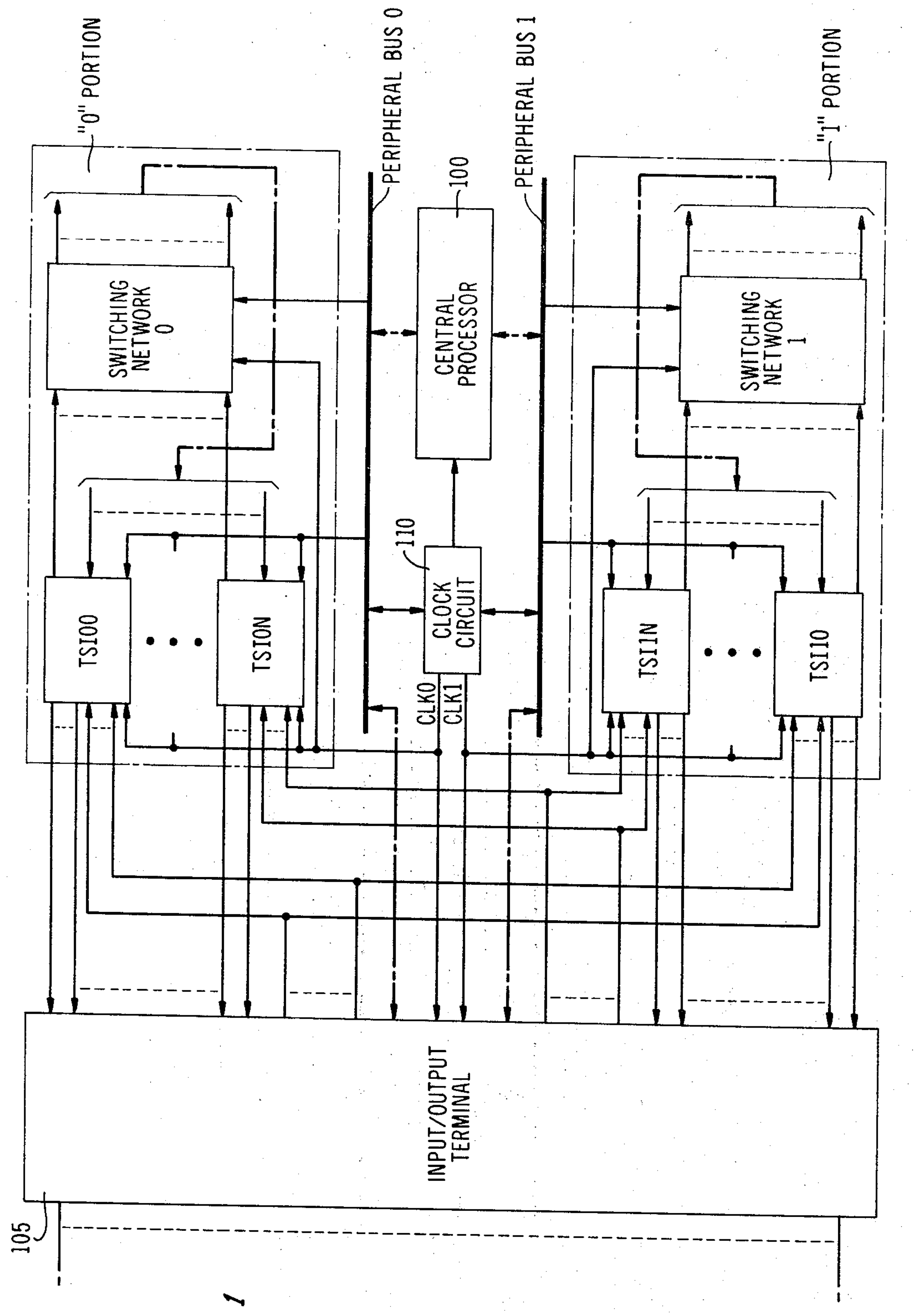
FIG. 1 is a block diagram representation of a duplicated time division switching system.

An illustrative timing system will now be described for use in the system of FIG. 1. The system of FIG. 1 is a duplicated time division switching system having duplicated time slot interchange units and duplicated switching networks. Information from incoming time division lines is simultaneously applied to a time slot interchange unit in the 0 portion (e.g., TSIOO) of the system and to a time slot interchange unit in the 1 portion (e.g., TSI10) of the system. Any necessary buffering and time slot interchange functions are performed in the time slot interchange units. From the time slot interchange units, information is transferred through the switching networks to the same or another time slot interchange unit to be transmitted to the I-0 terminal 105. For example, information which was simultaneously transmitted to TSI00 and TSI10 will be simultaneously transferred through switching network 0 and switching network 1, respectively, to another set of corresponding time slot interchange units (e.g., TSION and TSI1N). All of the transfer operations within the system are performed under the control of clock pulses generated by the clock circuit 110. In order to assure that a single failure in the clock circuit does not cause the entire system to fail, the clock circuit supplies two related but independent chains of clock pulses to the 0 and 1 portions of the system.

The illustrative clock system will now be described with reference to FIGS. 2 through 6. In order to attain very high reliability, the clock circuit 110 comprises four independent oscillator circuits which are labeled on FIGS. 4 and 5 as oscillator circuits A, B, C, and D. Oscillator circuit A is shown in FIG. 4. The circuit configuration of oscillator circuits B, C, and D is identical to that of oscillator circuit A and the detailed discussion which follows for circuit A is equally applicable to the other oscillator circuits. As shown in FIG. 4, oscillator circuit A comprises a voltage controlled oscillator 401 for producing a sinusoidal waveform. The phase lock circuit 420 causes the oscillator 401 to generate a signal which is phase locked to a reference signal occurring on conductor DRA. The phase lock circuit 420 compares the signal generated by the oscillator 401 with the reference signal and applies a correctional signal to the oscillator 401 when phase difference is detected. Such phase lock circuits are well known in the art and the details of such a circuit need not be explained herein. The reference signal on conductor DRA may be derived from an external signal source or from one of the other three oscillator circuits shown in FIG. 5. As will be discussed later herein, one of the four oscillator circuits A through D will be chosen to be the master and to supply a reference for the remaining oscillator circuits. If an external signal source is available, the external signal will be applied to the oscillator circuit selected to be the master, to serve as a reference signal for the master. The remaining oscillator circuits of the system will be phase locked to the signal generated by the master oscillator. If no external signal source is available, the master oscillator will be free running.

A number of fault detection devices are employed in each of the oscillator circuits A through D to facilitate early detection of failures. One such device is the phase unlock detector 421 which produces a signal representing a logical 1 when the signal generated by the oscillator 401 is not phase locked to the reference signal on conductor DRA. The details of the phase unlock detector need not be explained herein since these are known in the art and are described in the literature. Another fault detection device employed in this illustrative system is a phase meter 423 which latches in an off-normal position whenever the signals applied to the meter differ in phase by more than a prescribed amount, e.g., 5°. Phase meters of this type and which produce an output signal whenever the meter latches in the off-normal position, are commercially available. Another fault detection device employed is the level detector which compares the level of an input signal against a standard signal and generates an output signal when the input signal falls below the level of the standard. Such level detectors are known in the art and are described in the literature. Level detector 424 monitors the signal generated by the oscillator 401 and level detector 425 monitors the signal occurring on conductor DRA. Output signals generated by the fault detection devices 421, 423, 424, and 425 are stored in flip-flops 410 through 413, respectively.

When the oscillator circuit A is the master, and no external source is available, no signal will be produced on conductor DRA. Under those circumstances, the fault signals generated by phase unlock detector 421, the phase meter 423, and the level detector 425 are inhibited by an inhibit signal generated by NAND gate 429 and applied to NAND gates 430, 431, and 441. A signal representative of a logical 1 on conductor MSA-A indicates that oscillator circuit A has been selected as the master. The K relay 418 is operated by means of a signal from the central processor 100 when an external reference source is available. As can be seen from FIG. 4, if the K relay 418 is not operated and a logical 1 occurs on conductor MSA-A, NAND gates 426 and 429 will produce a signal representing a logical 0, causing NAND gates 430, 431, and 441 to be inhibited. The delay circuit 422 causes the inhibit signal generated by NAND gate 429 to persist for a period of time after the logical 1 signal has been removed from conductor MSA-A. When the oscillator circuit is switched from master to slave, the delayed signal allows it sufficient time to phase lock to the new master by preventing flip-flops 410, 411, and 413 from being set during the switchover period. If an external reference signal is supplied, the K relay 418 will operated, and NAND gates 426 and 427 will be inhibited by the closing of the normally open relay contacts 419. Thus, if an external reference signal is applied to DRA, NAND gates 430, 431, and 441 are not inhibited, even though oscillator circuit A is selected to be master.

Whenever any of the four flip-flops 410 through 413 in oscillator circuit A is set, a signal will be generated on conductor ESA by NAND gate 403, and transmitted to central processor 100 to alert the processor of a fault condition. Each of the flip-flops 410 through 413 may be selectively set and reset and the states of these flip-flops may be read by means of gates 436 through 439, under control of signals transmitted by the central processor 100 via the peripheral bus 301. Whenever either of the two flip-flops 410 or 411 is set, a signal equivalent to a logical 1 will be applied on conductor PA. Whenever the flip-flop 412 is set, a signal representing a logical 0 will be applied to conductor $\overline{LLA}$. The signals on conductors PA and $\overline{LLA}$ are employed in the master selector circuit 210, as discussed later herein.

The signal on conductor ESA is further employed in the output selector 402. Output selector 402 has two pairs of input conductors and one output conductor and may be implemented by the circuit configuration of FIG. 6, excluding transistors 512, 513, 517, and 518. The output terminals of NAND gates 403 and 406 will be connected to the base terminals of transistors 515 and 516, respectively, and conductors DRA and OSA will be connected to the base terminals of transistors 510 and 511, respectively. If none of the flip-flops 410 through 413 is set, NAND gate 403 will generate a signal representing a logical 0 which will be applied to the base terminal of transistor 515, thereby holding that transistor in the nonconducting state. The signal generated by NAND gate 403 is inverted by NAND gate 406. Hence, a signal representing a logical 1 is applied to the base terminal of transistor 516, forcing that transistor into the conducting state. With transistor 516 in the conducting state, the sinusoidal signal on conductor OSA, which is connected to the base terminal of transistor 511, will be reproduced on output conductor 503. When any one of the flip-flops 410 through 413 is set, a signal representing a logical 1 will be generated by NAND gate 403 and a logical 0 will be generated by NAND gate 406. Consequently, transistor 515 will be forced into the conducting state and transistor 516 will be forced into the nonconducting state. Thus, in this latter case, the signal occurring on conductor DRA will be reproduced on output conductor 503. The output signal of the output selector 402 is a sinusoidal signal which is applied to a shaper circuit 408, of a type well known in the art, which converts the sinusoidal wave to a square wave. Thus, the signals which are generated on conductor OSCA comprise a series of clock pulses, in the form of a square wave, derived either from the sinusoidal signal generated by oscillator 401 in phase with the reference signal on conductor DRA or, in case a fault is detected by any of the fault detection devices, directly from the reference signal on conductor DRA.

As mentioned earlier, the four oscillator circuits A through D are substantially identical. The principle of operation of the oscillator circuits B, C, and D will be apparent from the above discussion of oscillator circuit A with reference to FIG. 4. Oscillator circuits B through D receive reference signals on conductors DRB, DRC, and DRD, respectively, and a signal indicating that the corresponding oscillator circuit is selected as master on conductors MSB-B, MSC-C, and MSD-D, respectively. Oscillator circuits B, C, and D, like oscillator circuit A, generate a sinusoidal signal on the corresponding conductors OSB, OSC, and OSD; phase error signals on the corresponding conductors PB, PC, and PD; level error signals on the corresponding conductors LLB, $\overline{\text{LLB}}$, LLC, $\overline{\text{LLC}}$, LLD and $\overline{\text{LLD}}$; fault signals on corresponding conductors ESB, ESC, and ESD and a square wave signal on corresponding conductors OSCB, OSCC, and OSCD.

Figure 2:
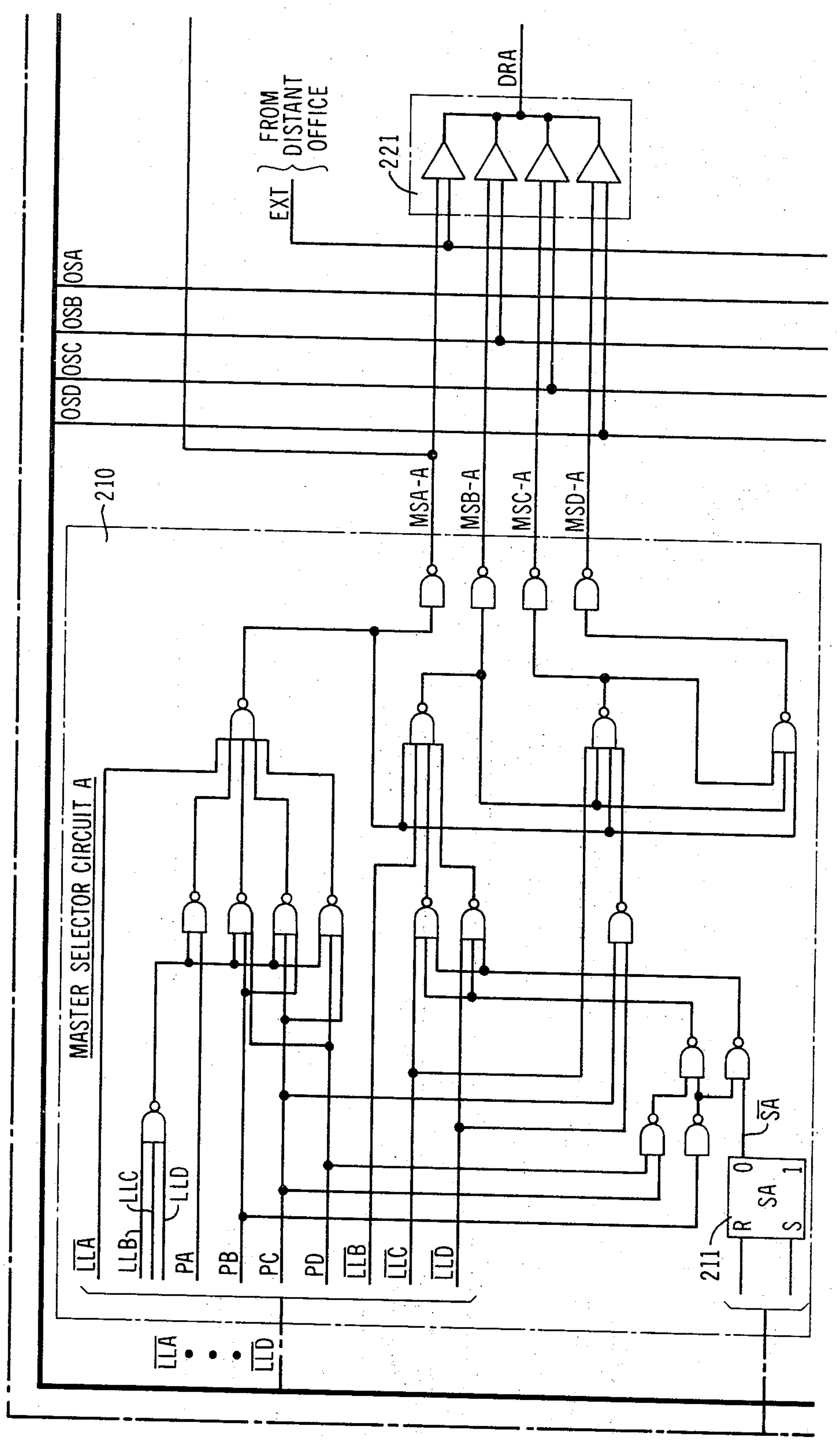
FIGS. 2 and 3 represent selector and control circuitry for four independent oscillator circuits.
Figure 3:
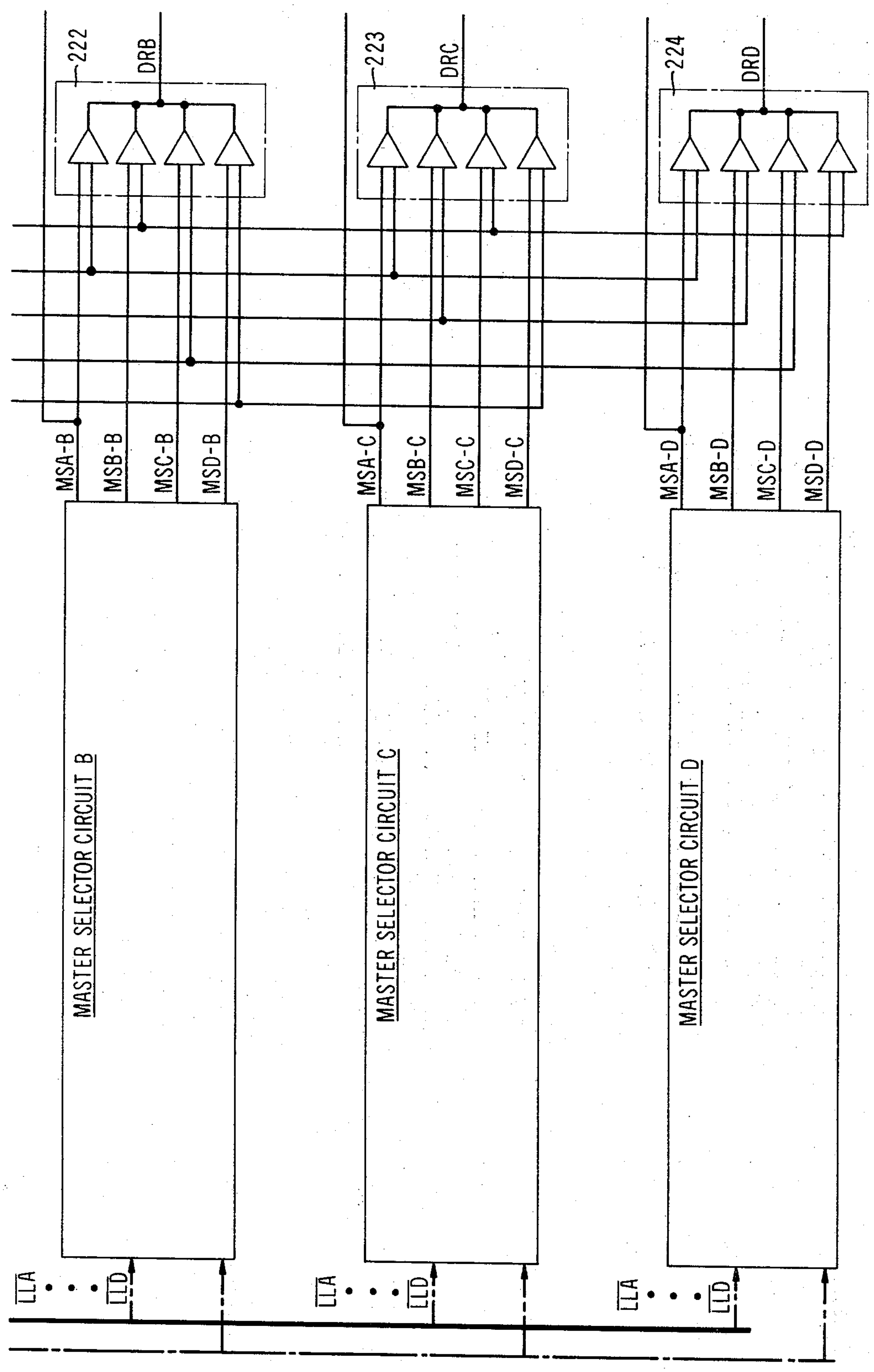
Figure 4:
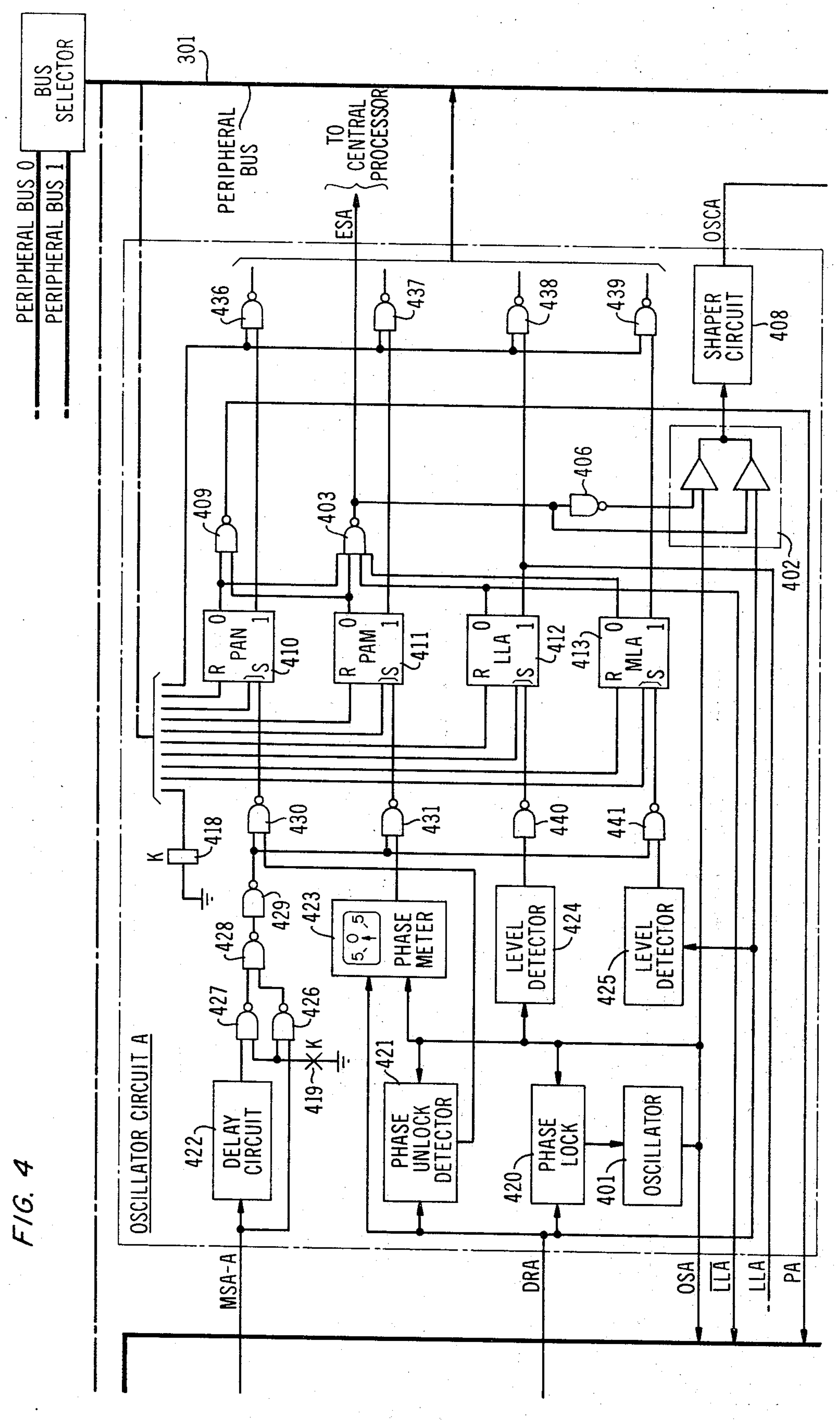
FIGS. 4 and 5 represent four oscillator circuits and output selector circuits.

The signals on conductors MSA-S, etc., are produced by master selector circuits A through D shown in FIGS. 2 and 3. The reference signals on conductors DRA through DRD are derived from signals occurring on conductors EXT (an external source), OSA, OSB, OSC, or OSD in output selector circuits 221 through 224. Selection as to which of the above signals is to be applied to the conductors DRA through DRD is made in the master selector circuits A through D. All four master selector circuits are identical, all four recieve the same input signals regarding phase and level errors detected in oscillator circuits A through D as described earlier herein with reference to FIGS. 4 and 5, and each comprises logic circuitry for independently generating selection signals from the input signals. The circuitry for master selector circuit A is representative of all four master selector circuits and will be described with reference to FIG. 2. In the master selector circuit, a logical 1 is produced on conductor MSA, thereby selecting oscillator circuit A to be the master, if no faults are detected from any of the four oscillator circuits. Oscillator circuit B, C, or D will be chosen as master when certain combinations of error signals, described below, occur. The logic for producing the signals on conductors MSA, MSB, MSC, and MSD for master selector A is shown in FIG. 2 in the form of a logic circuit. Table I shows the logic for any of the selector circuits in the form of Boolean equations.

TABLE I $$\text{MSA} = \overline{\text{LLA}}\,[\text{LLB}\cdot\text{LLC}\cdot\text{LLD} + \overline{\text{PA}}\,(\overline{\text{PC}}\cdot\overline{\text{PD}} + \overline{\text{PB}}\cdot\overline{\text{PD}} + \overline{\text{PB}}\cdot\overline{\text{PC}})]$$

$$\text{MSB} = \overline{\text{MSA}}\cdot\overline{\text{LLB}}\cdot[\text{LLC}\cdot\text{LLD} + \overline{\text{PB}}\cdot(\overline{\text{SA}} + \overline{\text{PC}\cdot\text{PD}})\,]$$

$$\text{MSC} = \overline{\text{MSA}}\cdot\overline{\text{MSB}}\cdot\overline{\text{LLC}}\,(\overline{\text{PC}} + \text{LLD})$$

$$\text{MSD} = \overline{\text{MSA}}\cdot\overline{\text{MSB}}\cdot\overline{\text{MSC}}$$

Referring to Table I above, the terms of the equations for MSA through MSD will be discussed. The equation for MSA indicates that in the absence of level errors or phase errors, a signal representing a logical 1 will be generated on conductor MSA, indicating that oscillator circuit A is to be the master. The equation for MSA will be zero if the term $\overline{\text{LLA}}$ is equal to zero, i.e., when a level error has been detected in oscillator circuit A. The term of the equation including PA will be zero in case a phase error is detected from oscillator circuit A. However, the equation for MSA will not go to zero in the presence of a phase error from an oscillator circuit A if the logical AND of the terms LLB, LLC, and LLD is equal to one, indicating that a level error has been detected from each of the other oscillator circuits of the system. Thus, even if a phase error is detected from oscillator circuit A, this circuit will remain the master if level errors have been detected from all of the other oscillator circuits. The term of the equation for MSA which includes $\overline{\text{PA}}$, will go to zero, even if there is no phase error detected from oscillator circuit A, if a phase error is detected on any two of the other three oscillator circuits. The terms $\overline{\text{PB}}$, $\overline{\text{PC}}$, and $\overline{\text{PD}}$ are included in the equation for MSA in the combinations shown to cause a new master to be selected in case two oscillator circuits are out of phase with the master, since this would indicate a high probability that the fault lies in the master.

The equation for MSB includes the term $\overline{\text{MSA}}$, causing the equation to be zero when oscillator circuit A is selected as master. Similarly, the equation for MSC includes the terms $\overline{\text{MSA}}$ and $\overline{\text{MSB}}$ to force the equation to zero when either oscillator circuit A or B is the master. The equation for MSD simply consists of the AND function of $\overline{\text{MSA}}$, $\overline{\text{MSB}}$, and $\overline{\text{MSC}}$, indicating that oscillator circuit D is selected to be master only if none of the other three oscillator circuits are available. The term $\overline{\text{LLB}}$ in the equation for MSB causes the equation to go to zero if a level error is detected from oscillator circuit B. The term in the brackets in the equation for MSB includes $\overline{\text{SA}}$, which represents the zero output of the SA flip-flop 211 shown in FIG. 2. The term $\overline{\text{SA}}$ serves to change the equation for MSB, thus changing the selection algorithm of the master selector 210 under certain system operating conditions. As can be seen from Table I, the equation for MSB is independent of the term $\overline{PC \cdot PD}$ when the SA flip-flop is reset ($\overline{SA} = 1$) and is dependent on that term if the SA flip-flop is set ($\overline{SA} = 0$). The SA flip-flop 211 may be set and reset from the central processor 100 via the peripheral bus 301. As mentioned earlier with respect to FIG. 4, the error flip-flops 410 through 413 are set upon the detection of an error in the oscillator circuit. Since the local oscillators (e.g., 401) of the slave oscillator circuits are phased locked to a reference signal generated by the master, it is possible that the slave circuits will detect a phase error resulting from shifts in the reference signal generated by the master. Thus, phase error indications must be specifically analyzed to determine whether the fault is in the master or in the slave oscillator circuit. The central processor 100 is adapted to respond to signals on conductors ESA through ESD (FIGS. 4 and 5) to interrogate the states of error flip-flops 410 through 413 of oscillator circuit A and the corresponding error flip-flops of oscillator circuits B, C, and D to analyze the error indications. If it is found that oscillator circuit A was master and caused the trouble, the central processor 100 may then set an appropriate one of the error flip-flops of oscillator circuit A (e.g., flip-flop 412) and reset any of the error flip-flops in oscillator circuits B, C, or D which were set as a result of a fault in oscillator circuit A. Consequently, the system thereafter will be running with three properly operating oscillator circuits. The central processor 100 may then cause the SA flip-flop 211 to be set, thereby allowing the term $\overline{PC \cdot PD}$ to take effect in the equation for MSB. In this manner, the master selector is made responsive to phase errors in both oscillator circuits C and D even in the absence of phase errors in oscillator circuit B ($\overline{PB} = 1$). Control over the equation for MSB by means of the SA flip-flop is essential in order to cause an orderly transition to the first error-free oscillator circuit in the case where A is master. For example, when A is master and a slight phase shift occurs in the signal generated by the master, two of the other oscillator circuits, e.g., C and D, may generate a phase error signal ($PC = 1$, $PD = 1$). This in turn will cause the equation for MSA to go to zero in the absence of any level errors. Referring to Table I, it can be seen that if the $\overline{SA}$ were not included in the equation for MSB, MSB would also go to zero, and MSD would be the only nonzero equation. By inclusion of the term $\overline{SA}$ in the equation for MSB, the term $PC \cdot PD$ can be ignored if oscillator circuit A is master, and be recognized when B is master.

The term $\overline{LLC}$ in the equation for MSC causes the equation to go to zero if a level error is detected from oscillator circuit C. The term in the brackets in the equation for MSC causes it to go to zero in case a phase error is detected from oscillator circuit C unless a level error has been detected from oscillator circuit D.

The reference signals occurring on conductors DRA through DRD are derived from the sinusoidal signals on conductors EXT and OSA through OSD in accordance with the signals occurring on conductors MSA through MSD. Table II below shows in equation form how these signals are combined in output selectors 221 through 224 shown in FIGS. 2 and 3. As mentioned earlier, it is not required that an external signal be supplied on conductor EXT. When no external source is connected to conductor EXT, this conductor may be conveniently connected to ground which is equivalent to applying logical 0 to the conductor.

TABLE II $$DRA = MSA \cdot EXT + MSB \cdot OSB + MSC \cdot OSC + MSD \cdot OSD$$

$$DRB = MSA \cdot OSA + MSB \cdot EXT + MSC \cdot OSC + MSD \cdot OSD$$

$$DRC = MSA \cdot OSA + MSB \cdot OSB + MSC \cdot EXT + MSD \cdot OSD$$

$$DRD = MSA \cdot OSA + MSB \cdot OSB + MSC \cdot OSC + MSD \cdot EXT$$

Figure 6:
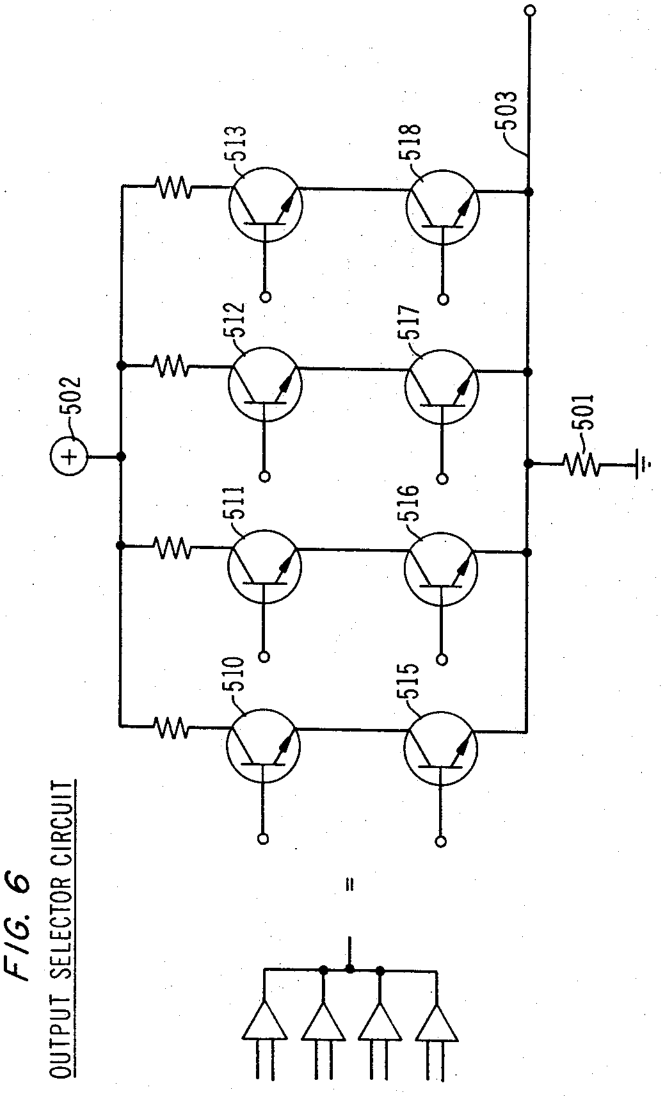
FIG. 6 shows an output selector circuit of the type shown symbolically in FIGS. 2 through 5.

Output selector circuits 221 through 224 may be implemented by a circuit arrangement such as shown in FIG. 6. As a specific example, the circuit of FIG. 6 will be assumed to be connected in the position of output selector 221 in FIG. 2. In that position conductors EXT, OSB, OSC, and OSD are connected to the base terminals of transistors 510 through 513 in FIG. 6, respectively; and conductors MSA-A through MSD-A are connected to the base terminals of transistors 515 through 518, respectively. Conductors EXT, OSB, OSC, and OSD will carry a sinusoidal signal and conductors MSA-A through MSD-A will carry either a positive signal representing a logical 1 or a near zero signal representing logical 0. The output signal of the output selector is generated on conductor 503. Under normal conditions only one of the four conductors MSA-A through MSD-A will carry a logical 1. Assume, for example, that oscillator circuit A has been selected to be the master and, therefore that conductor MSA-A carries a signal representing a logical 1 and conductors MSB-A through MSD-A carry signals representing logical 0. Consequently, the transistor circuit labeled 515 will be in the conducting state whereas transistor circuits 516 through 518 will be in the nonconducting state. Sinusoidal signals are continuously being applied to the base terminals of transistor circuits 510 through 513 by the external source and oscillator circuits B, C, and D. In the example now being considered, transistor 515 is in the conducting state and the sinusoidal signal on conductor EXT will control the current flow from the source 502 through transistors 510 and 515 and resistor 501. Thus, the signal occurring on conductor EXT will be reproduced on conductor 503. The sinusoidal signals applied to the base terminals of transistors 511 through 513 will not appear on conductor 503 since transistors 516 through 518 are held in the nonconducting state.

Figure 5:
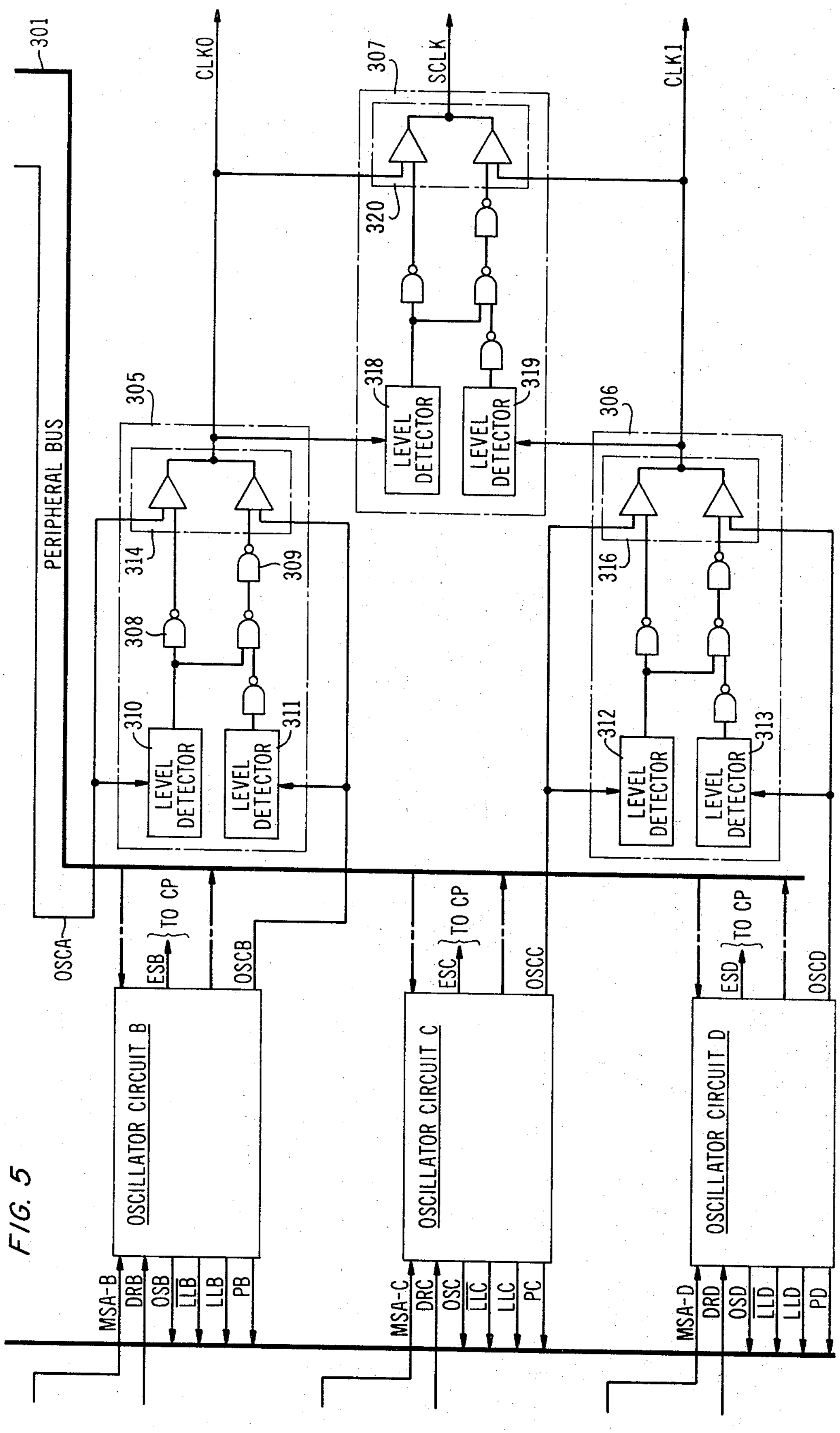
Figure 7:
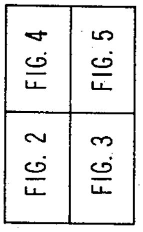
FIG. 7 shows the arrangement of FIGS. 2 through 5.

Four identical but independent clock pulse chains are generated on conductors OSCA, OSCB, OSCC, and OSCD. The clock pulses on these conductors may be used to drive four systems in parallel. However, for the illustrative system shown in FIG. 1, it is required that two independent identical clock pulse chains be generated by the clock circuit 110. The two clock pulse chains are generated on conductors CLKO and CLK1 from the signals on conductors OSCA, OSCB, OSCC, and OSCD as shown in FIG. 5. For certain other applications a single highly reliable pulse chain can be generated on conductor SCLK.

FIG. 5 shows how output signals from the four oscillator circuits A through D are combined to produce the clock pulse sequences on conductors CLK0, CLK1, and SCLK. The signals on conductor CLK0 are derived from either the signals on conductor OSCA or OSCB. The signal on conductor CLK1 is derived either from the signal on conductor OSCC or OSCD. Selection as to which signal is to be generated on conductors CLK0 and CLK1 is made by selector circuits 305 and 306, respectively. The signals on conductors CLK0 and CLK1 are applied to conductor SCLK by selector circuit 307. Each of these selector circuits comprises two level detector circuits (e.g., 310 and 311) which monitor the voltage level of the signal occurring on the conductors to which they are connected, and which produce an output signal equivalent to a logical 1 when the level of the signal drops below a reference level. Each selector circuit further comprises an output selector (e.g., 314). The operation of the output selectors 314, 316, and 320 may be understood with reference to FIG. 6. For example, the output selector 314 may be represented by an arrangement similar to that shown in FIG. 6 but not including transistors 512, 513, 517, and 518. The output of NAND gates 308 and 309 will be connected to the base terminals of transistors 515 and 516, respectively, and conductors OSCA and OSCB will be connected to the base terminals of transistors 510 and 511, respectively. Under these conditions, the signal appearing on conductor 503 will be a reproduction of the signal on conductor OSCA whenever the output of NAND gate 308 is a positive voltage representing a logical 1 (i.e., when no level error is detected on conductor OSCA), and will be a reproduction of the signal applied on conductor OSCB whenever a positive signal representing a logical 1 is produced by NAND gate 309 (i.e., when there is a level error on conductor OSCA and no level error on conductor OSCB).

As can be seen from FIG. 5, selector circuit 305 will cause the signal appearing on conductor OSCA to be applied to conductor CLK0 through operation of output selector 314 whenever the level detector 310 produces a signal equivalent to a logical 0, indicating that no level error has been detected on conductor OSCA. If a level error is detected on this conductor and no level error has been detected on conductor OSCB, the signal from conductor OSCB will be applied to conductor CLK0 through operation of output selector 314. Operation of selector circuit 306 is substantially identical to that of selector circuit 305 and the signal from conductor OSCC is applied to conductor CLK1 if no level error has been detected on OSCC. If a level error is detected on OSCC and no level error has been detected on OSCD, the signal from conductor OSCD will be applied to conductor CLK1. If a level error is detected on both conductors OSCA and OSCB or on both conductors OSCC and OSCD, no signal will be transmitted on conductors CLK0 or CLK1, respectively.

For applications in which it is desirable to produce a single highly reliable clock pulse chain instead of two independent chains, the output signals produced on conductors CLK0 and CLK1 may be employed to produce an output signal on the conductor SCLK. Selector circuit 307 may be used to apply the signal occurring on conductor CLK0 to conductor SCLK if no level error is discovered by the level detector 318 on conductor CLK0 and to apply the signal occurring on conductor CLK1 to conductor SCLK if an error is detected on conductor CLK0 but no error is detected on conductor CLK1.

It is to be understood that the above-described arrangement is merely illustrative of the application of the principles of the invention; numerous other arrangements may be devised by those skilled in the art without departing from the spirit and scope of the invention.

I claim

1. A clock pulse generating system comprising:
a plurality of output transmission means;
a corresponding plurality of signal generators;
master selection means for selecting one of said plurality of signal generators as master generator;
means for phase locking the remainder of said plurality of signal generators to signals generated by the generator selected as master;
output selection means for applying selectively to each of said transmission means corresponding to said remainder of said plurality of signal generators signals generated by said corresponding signal generator and said signals generated by said master generator and for applying output signals of said master generator to said transmission means corresponding thereto.

2. A clock pulse generating system in accordance with claim 1 and further comprising:
an external source of reference signals and means for phase locking the signal generator selected as master to said reference signals.

3. A clock pulse generating system comprising:
a plurality of output transmission means;
a plurality of signal generators equal in number to said plurality of output transmission means and corresponding on a one-for-one basis therewith;
fault detection means coupled to said signal generators for generating selection control signals defining the operating states of said signal generators in said clock pulse generating system;
master selection means connected to said fault detection means and responsive to said selection control signals for selecting one of said signal generators as a master generator and for generating corresponding master control signals;
means for phase locking the remainder of said plurality of signal generators to signals generated by said selected master generator; and
output selection means responsive to said master control signals for applying selectively signals from said corresponding signal generator and from said master generator to each of said transmission means corresponding to said remainder of said plurality of signal generators and for applying signals from said master generator to said transmission means corresponding thereto.

4. The system in accordance with claim 3 wherein said plurality of signal generators are individually preferred as master signal generator in an ordered sequence, said master selection means comprises: bistable means having first and second stable states, means for controlling the states of said bistable means, and said master selection means comprises means responsive to said selection control signals and to output signals of said bistable means for selecting the next signal generator in the ordered sequence indicated to be trouble free by said selection control signals as said master signal generator upon the occurrence of an indicated error in the operation of the current master generator.

5. A clock pulse generating system comprising:
a plurality of circuit means each comprising a local signal generator, reference signal input terminals, means for phase locking the local signal generator to signals applied to said reference signal input terminals, error detection circuits, output terminals, and output selection means responsive to signals generated by said error detection circuits to selectively apply signals appearing on said reference signal input terminals and signals generated by said local signal generator to said output terminals;

master selector means responsive to signals generated by the error detection circuits of said plurality of circuit means to selectively designate one of said plurality of circuit means as master and to apply signals generated by the local signal generator of the circuit means designated as master to the reference signal input terminals of the other circuit means of said plurality of circuit means.

6. A clock pulse generating system in accordance with claim 5 wherein said error detection circuits include level detection circuits which generate level error signals when certain signals fall below a preset level; and wherein said master selector means comprises means for designating as master a first one of said circuit means in the absence of any error signals from the error detection circuits of said first circuit means, and responsive to a level error signal generated by said first circuit means to designate as master a next circuit means in which no level error has occurred.

7. A clock pulse generating system in accordance with claim 5 wherein said plurality of circuit means comprises at least three of said circuit means;

wherein said error detection circuits include circuits which detect phase difference between certain signals and a reference signal to generate phase error signals; and wherein said master selector means comprises means for designating as master a first one of said circuit means, and responsive to phase error signals generated by any two of said other circuit means to designate one of said other circuit means as master.

8. A clock pulse generating system in accordance with claim 5 and further comprising selector means connected to the output terminals of a first, and a second of said plurality of circuit means and comprising signal level error detection circuits for selectively applying signals from the output terminals of said first and second circuit means to a first output transmission means; and selector means connected to the output terminals of a third and a fourth of said plurality of circuit means and comprising signal level error detection circuits for selectively applying signals from the output terminals of said third and fourth circuit means to a second output transmission means.

9. A clock pulse generating system in accordance with claim 8 and further comprising:

selector means connected to said first and said second output transmission means, and comprising signal level error detection means for applying selectively signals from said first and said second output transmission means to a third output transmission means.

10. A clock pulse generating system comprising:

a plurality of output transmission means;

a plurality of signal generators;

master selection means for selecting one of said plurality of signal generators as master generator in accordance with a plan wherein said plurality of signal generators are individually preferred as master signal generator in an ordered sequence; and means for deriving output signals from signals generated by said master generator and applying said output signals to said output transmission means;

said master selection means comprises:

means corresponding in number to said plurality of signal generators and coupled to said signal generators for generating selection control signals defining the operating states of said signal generators in said clock pulse generating system, bistable means having first and second stable states, means for controlling the states of said bistable means, and means responsive to said error signals and to output signals of said bistable means for selecting the next signal generator in the ordered sequence indicated to be trouble free as said master signal generator.

* * * * *

UNITED STATES PATENT OFFICE
CERTIFICATE OF CORRECTION

Patent No. 3,769,607 Dated October 30, 1973

Inventor(s) William Thelen

It is certified that error appears in the above-identified patent and that said Letters Patent are hereby corrected as shown below:

Column 4, line 47, "418 will operated" should read --418 will be operated--. Column 5, line 58, "on conductors MSA-S" should read --on conductors MSA-A--. Column 5, line 67, "all four recieve" should read --all four receive--. Column 6, line 34, "equation including PA" should read --equation including $\overline{PA}$--.

Signed and sealed this 23rd day of April 1974.

(SEAL)
Attest:

EDWARD M. FLETCHER, JR.
Attesting Officer

C. MARSHALL DANN
Commissioner of Patents